United States Patent [19]

Nagasubramanian et al.

[11] 4,107,264
[45] Aug. 15, 1978

[54] RECOVERY OF TiO₂ FROM ILMENITE-TYPE ORE BY A MEMBRANE BASED ELECTRODIALYSIS PROCESS

[75] Inventors: Krishnamurthy Nagasubramanian, Parsippany; Kang-Jen Liu, Bridgewater, both of N.J.

[73] Assignee: Allied Chemical Corporation, Morris Township, Morris County, N.J.

[21] Appl. No.: 851,221

[22] Filed: Nov. 14, 1977

[51] Int. Cl.² .............................................. C01G 23/04
[52] U.S. Cl. ........................................ 423/81; 423/83; 423/85; 423/86; 423/143; 423/612; 204/180 P
[58] Field of Search ................... 423/81, 82, 83, 85, 423/86, 483, 488, 612, 633, 72, 144, 143; 204/94, 102, 180 P

[56] References Cited

U.S. PATENT DOCUMENTS

| | | | |
|---|---|---|---|
| 1,501,587 | 7/1924 | Doremus | 423/72 |
| 2,042,435 | 5/1936 | Svendsen | 423/81 |
| 2,829,095 | 4/1958 | Oda et al. | 204/180 P |
| 3,450,609 | 6/1969 | Carlin | 204/180 P |
| 3,787,304 | 1/1974 | Chlanda et al. | 204/180 P |
| 3,788,959 | 1/1974 | Smith | 204/180 P |

*Primary Examiner*—Brian Hearn
*Attorney, Agent, or Firm*—Robert J. North; Robert A. Harman

[57] ABSTRACT

An improved process is described for recovering TiO₂, useful as a white pigment, from ilmenite-type ores, including the steps of digesting the ore with aqueous hydrofluroic acid, separating out iron impurities from the resulting solution, precipitating hydrated titanium dioxide from the iron-free solution with ammonium hydroxide, and calcining the precipitate to obtain pigmentary TiO₂, wherein the improvement comprises subjecting aqueous solutions of by-product ammonium fluoride, formed in the process, to electrodialytic water-splitting to form an aqueous solution of ammonium hydroxide and an aqueous solution of hydrogen fluoride and recycling said aqueous ammonium hydroxide to the precipitation step and said aqueous hydrogen fluoride to the digestion step.

5 Claims, 3 Drawing Figures

RECOVERY OF TIO₂ FROM ILMENITE-TYPE ORE BY A MEMBRANE BASED ELECTRODIALYSIS PROCESS

BACKGROUND OF THE INVENTION

1. Field of Use

This invention relates to a process for recovering $TiO_2$ from ilmenite-type ores by digestion with hydrofluoric acid, in which hydrofluoric acid and ammonium hydroxide are recovered by an electrodialytic water-splitting process from by-product aqueous ammonium fluoride, and recycled.

2. Brief Description of the Prior Art

Processes for recovering $TiO_2$ from ilmenite-type ores by digesting the ore with hydrofluoric acid or ammonium fluoride are well known in the art.

U.S. Pat. No. 1,501,587 (1924) describes the use of aqueous hydrofluoric acid for digesting ilmenite-type ores to recover pigmentary titanium dioxide in which the hydrofluoric acid may be recovered by acidification of aqueous by-product fluoride solutions followed by distillation.

U.S. Pat. No. 2,042,435 (1936) describes the use of ammonium fluoride as an aqueous solution or as a dry reagent for the digestion of ilmenite-type ores. Following digestion with either reagent, excess ammonium fluoride is volatilized off and the titanium values in the aqueous solution are leached out with water or a non-alkaline solution of aqueous ammonium fluoride. Iron impurities are filtered off, the solution is neutralized with ammonia and then treated with a soluble sulfide to precipitate the remainder of the iron impurities and other heavy metal impurities, which were not filtered off initially. Aqueous ammonia is then added to precipitate hydrated titanium dioxide which is then filtered and calcined to produce pigmentary $TiO_2$. The by-product solutions of ammonium fluoride and ammonium hydroxide can be combined and then recycled for use in the digestion step. However, the solutions must be evaporated to obtain ammonium fluoride as a dry reagent for use in the preferred process.

U.S. Pat. No. 3,787,304 (1974) describes a process for converting waste fluosilicic acid into hydrogen fluoride by treating an aqueous solution of fluosilicic acid with an alkali hydroxide to form a solution of alkali fluorides. The solution of alkali fluorides is subjected to the process of electrodialytic water-splitting to form an aqueous solution of alkali hydroxide and an aqueous solution of hydrogen fluoride from which anhydrous hydrogen fluoride may be recovered.

What is needed and what the prior art does not provide is a process for recovering pigmentary $TiO_2$ from ilmenite-type ores by digestion with hydrofluoric acid, wherein recovery and recycle of all necessary liquid reagents can be performed without a separate distillation step and where the process contains no significant effluent streams.

SUMMARY OF THE INVENTION

In accordance with this invention there is provided an improved process for producing titanium dioxide from ilmenite ore including the steps of (a) digesting ilmenite ore with aqueous hydrogen fluoride to form a solution of titanium fluoride compounds and soluble iron fluoride impurities; (b) separating substantially the iron-ammonium fluoride impurities from the solution; (c) separating the remainder of the iron fluoride impurities by precipitating with ammonium sulfide and filtering off; (d) adding ammonium hydroxide to precipitate hydrated titanium dioxide and to form aqueous ammonium fluoride; (e) calcining the hydrated titanium dioxide to form pigmentary titanium dioxide and (f) converting the precipitated iron-ammonium fluoride impurities from step (b) to form iron oxide and aqueous ammonium fluoride, in which the improvement which comprises subjecting the combined ammonium fluoride solutions from steps (d) and (f) to electrodialytic water-splitting to form an aqueous solution of ammonium hydroxide and an aqueous solution of hydrogen fluoride and recycling said aqueous ammonium hydroxide to step (d), and said aqueous hydrogen fluoride to step (a).

DESCRIPTION OF THE INVENTION AND PREFERRED EMBODIMENTS

Figure 1:
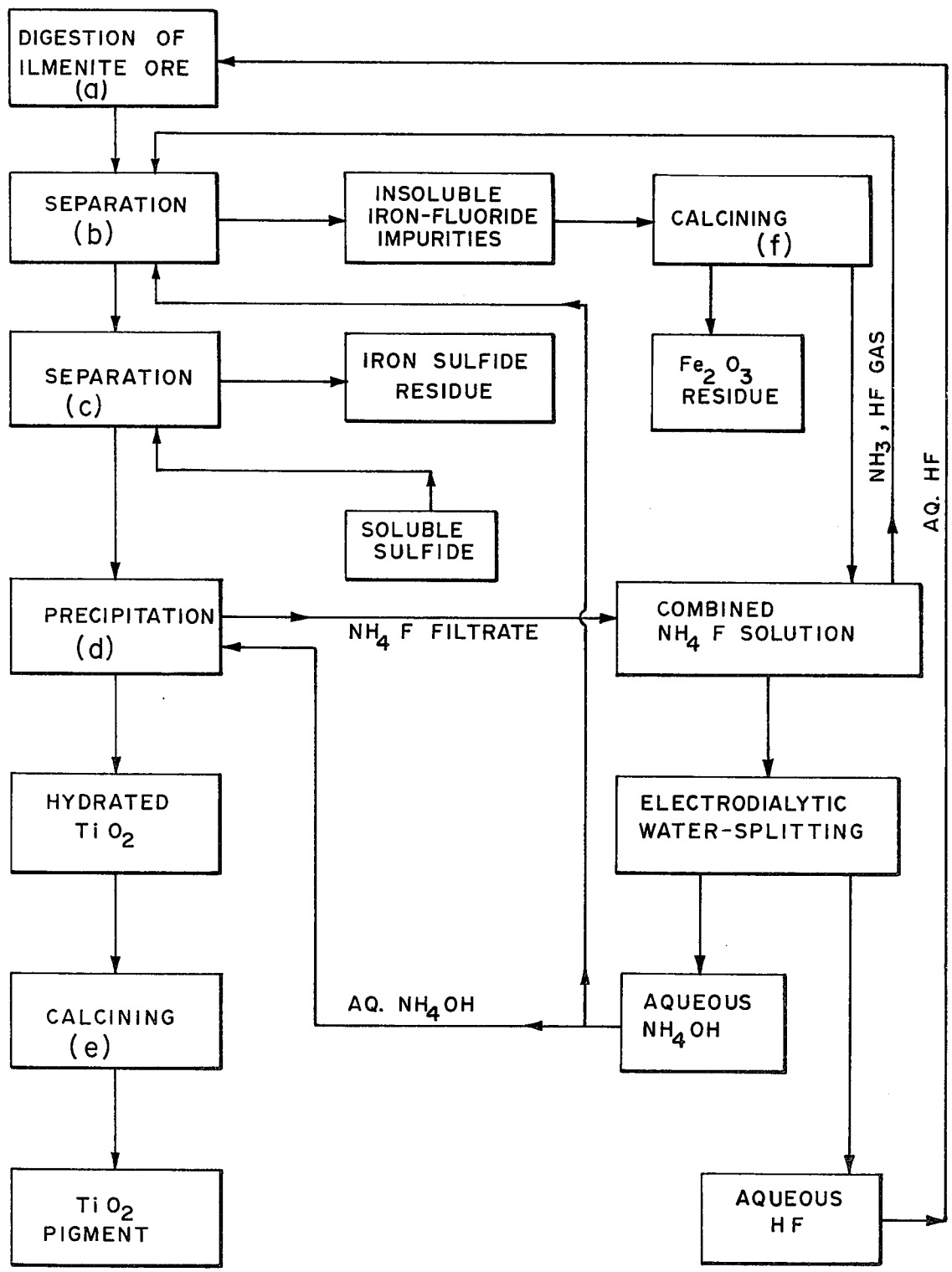
FIG. 1 illustrates a schematic flow diagram of the improved process of the invention depicting the various steps involved in converting ilmenite ore to pigmentary $TiO_2$ including the novel step of collecting the ammonium fluoride by-product solutions and subjecting them to electrodialytic water-splitting to produce aqueous solutions of HF and $NH_4OH$ for recycle in the process.

Description of the invention can be made by reference to FIG. 1. In process step (a), digestion of the ilmenite-type ore is conducted with aqueous hydrogen fluoride consisting usually of about a 10 to 25 weight percent solution of HF. The digestion step is generally carried out in a suitable acid resistant vessel at a temperature of about 50° to 100° C, for a period of about 2 to 18 hours. At the completion of the digestion step, the insoluble iron-ammonium fluoride impurities are usually separated out of the digestion reaction mixture by the addition of aqueous ammonium fluoride and aqueous ammonium hydroxide in order to achieve a pH of about 6.0 to 6.8 to precipitate iron-ammonium fluoride impurities, leaving soluble titanium fluoride in solution. The insoluble iron-ammonium impurities are recovered by filtration in process step (b). Following filtration, the insoluble iron-ammonium impurities are converted, usually by calcining, in process step (f) forming iron oxide residue, $Fe_2O_3$, which can be of high quality and such particle size as to be useful itself as a pigment in decorative coatings. The gaseous by-products of the calcination, ammonia and hydrogen fluoride are collected prior to the electrodialytic water-splitting step. The aqueous filtrate from step (b) is treated with a water-soluble sulfide such as ammonium sulfide or sodium sulfide to precipitate small amounts of iron impurities not separated in step (b). Following precipitation, the insoluble iron sulfide is filtered off and the remaining aqueous filtrate containing soluble titanium fluorides is then treated in step (d) with aqueous ammonium hydroxide to precipitate hydrated titanium dioxide, represented by the formulas $Ti(OH_4)$ or $TiO_2 \cdot H_2O$. The precipitated material is calcined in step (e) to form pigmentary $TiO_2$, useful in many industrial pigment applications such as interior and exterior house paints and decorative automotive finishes. The aqueous ammonium fluoride filtrate from step (d) is combined with the effluent gases from the calcining in step (f) to form a combined solution of aqueous ammonium fluoride. In the process, the steps (a) to (f) are conventional and known in the art and are adequately described in patents U.S. Pat. No. 1,501,587 and U.S. Pat. No. 2,042,435, including various process modifictions that can be utilized with respect to reaction temperature, concentration of reagents and sequential order of processing steps in improving yield, particle size and pigmentary quality of formed $TiO_2$.

The novel feature and advantage of this improved process is that the by-product aqueous ammonium fluoride solutions can be combined and converted by electrodialytic water-splitting to an aqueous solution of ammonium hydroxide for recycle to step (d), the precipitation step, and an aqueous solution of HF for recycle to step (a), the digestion step. The recovery, conversion and recycle steps do not require expensive distillation, evaporation or scrubber equipment as does the prior art where by-product aqueous ammonium fluoride must be distilled to remove water to obtain dry ammonium fluoride reagent for the digestion step. Also, since aqueous HF is usually a much more efficient reagent for the digestion step, in contrast to aqueous ammonium fluoride, the yields of $TiO_2$ recovery from ilmenite ore are usually higher and the improved process of this invention enjoys a distinct advantage over prior art "wet" methods of digesting ilmenite-type ores with aqueous ammonium fluoride or aqueous hydrogen fluoride.

The term "electrodialytic water-splitting" as used herein refers to the action of the bipolar membrane in the apparatus and is easily seen from the following discussion. The bipolar membrane, represented by the symbol BM in FIGS. 1 and 2, consists essentially of anion-permeable and cation-permeable sides separated by an interface containing a thin layer of water. The cation-permeable side faces the cathode and the anion-permeable side faces the anode. Because of the permselectivity of the membranes comprising the bipolar membrane, when a direct current of electricity is passed through the membrane, the ions of any salt present in the thin layer of water, separating the two membranes, are quickly removed leaving only the hydrogen and hydroxyl ions from the dissociation of water to carry the current. Under the influence of the electric current, the hydrogen ions move toward the cathode through the cation-permeable side of the bipolar membrane while the hydroxyl ions move toward the anode through the anion-permeable side of the bipolar membrane. Thus the term "electrodialytic water-splitting" refers to the migration of hydrogen and hydroxyl ions, formed by the dissociation of water, through the bipolar membrane in opposite directions under the influence of an applied electric potential.

Figure 2:
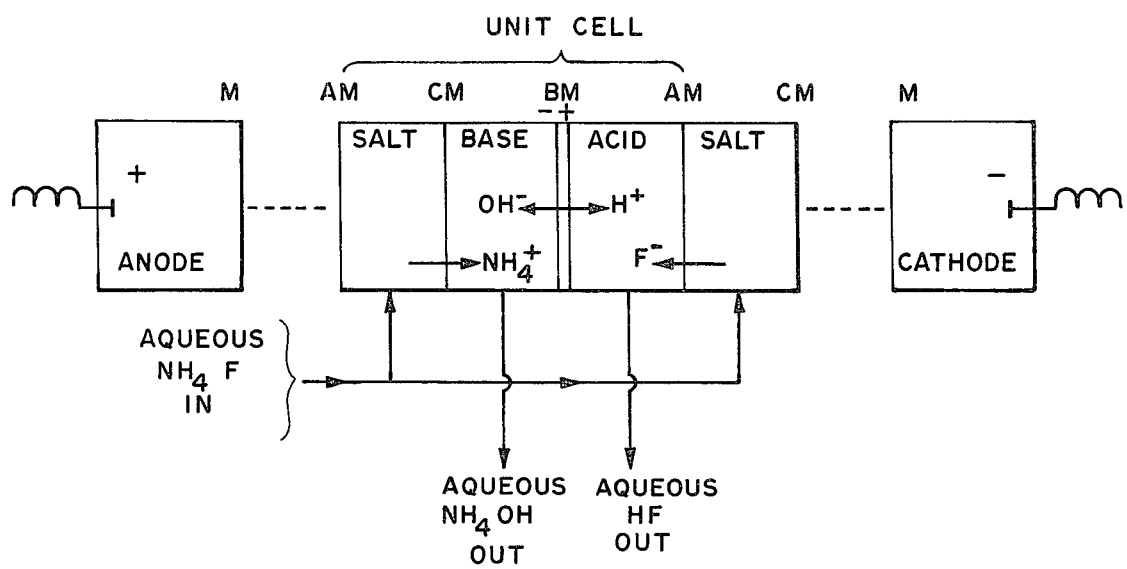
FIG. 2 illustrates a three compartment electrodialytic water-splitting assembly in simplified form. Here, the assembly is shown to be comprised of one unit cell between the anode and cathode compartments. In practice, several hundred unit cells, and greater, may actually be employed in a single assembly. The symbols AM, BM and CM refer to anion-permeable membrane, bipolar membrane and cation-permeable membranes, respectively. The symbol M refers to a conductive membrane, in general, which can be a cation- or anion-permeable or a bipolar membrane. The unit cell sequentially comprises anion-permeable membrane; salt compartment; cation-permeable membrane; base compartment; bipolar membrane; acid compartment. The bipolar membrane contains an anion-permeable side which faces the anode and a cation-permeable side which faces the cathode. Direction of flow of the ions under the influence of an applied potential is indicated, and the current in the assembly is transported by migrating cations and anions. Entrance feed streams of the aqueous ammonium fluoride solution as well as exit streams of aqueous hydrogen fluoride and ammonium hydroxide, for recycle, are indicated.

FIG. 2 illustrates a "three-compartment" electrodialytic water-splitting apparatus, where a unit cell, with an adjacent salt compartment is shown located between an anode and cathode compartments. In practice, an industrial assembly usually consists of hundreds of unit cells possessing a large capacity. The unit cell as illustrated, is comprised sequentially of anion-permeable membrane; salt compartment; cation-permeable membrane; base compartment; bipolar membrane; acid compartment. Usually, cation-permeable membranes are employed enclosing the anode and cathode. Aqueous ammonium fluoride solution fed into the salt compartments and the base compartment initially contains a dilute solution of aqueous ammonium hydroxide and the acid compartment, a dilute solution of aqueous hydrogen fluoride. Under the influence of an applied potential between the anode and cathode, ammonium ion, $NH_4^+$, is caused to migrate from the salt compartment toward the cathode through the cation-permeable membrane into the base compartment; due to the permselectivity of the bipolar membrane, the ammonium ion is constrained from migrating out of the base compartment. Hydroxyl ion, generated at the bipolar membrane interface, is caused to migrate through the perm-selective anion-permeable membrane portion of the bipolar membrane into the base compartment and is constrained from migrating out of the base compartment by the adjacent cation-permeable membrane. The combination of ammonium and hydroxyl ions thus forms ammonium hydroxide, which can then be drawn off from the assembly for recycle in the process. Simultaneously, fluoride ion, $F^-$, is caused to migrate toward the anode from an adjacent salt compartment to the unit cell through the anion-permeable membrane into the acid compartment and is constrained from migrating out of the acid compartment due to the perm-selectivity of the bipolar membrane. Hydrogen ion co-generated with hydroxyl ion at the bipolar membrane interface from the dissociation of water, is caused to migrate through the cation-permeable membrane portion of the bipolar membrane into the acid compartment and is constrained from migrating out of the acid compartment by the anion-permeable membrane. The combination of hydrogen and fluoride ions thus forms hydrogen fluoride, HF, which can be drawn off from the assembly for recycle.

Figure 3:
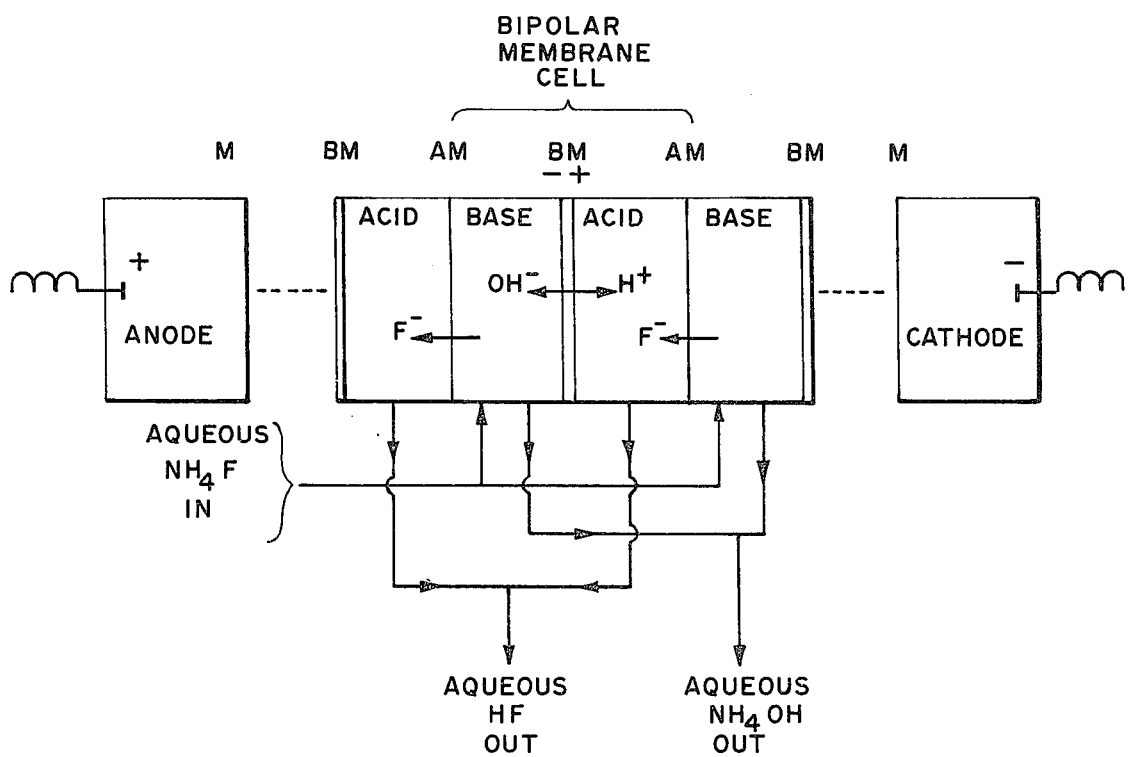
FIG. 3 illustrates a two compartment water-splitting assembly in simplified form. Here the assembly is shown to be comprised of one bipolar membrane cell located between the anode and the cathode compartments. In practice, several hundred bipolar membrane cells and greater, may actually be employed. The membrane symbols M, AM, BM and CM are the same as described in FIG. 2. The bipolar membrane cell sequentially comprises anion-permeable membrane; base compartment; bipolar membrane; acid compartment. The bipolar membrane is positioned as described above with respect to the anode and cathode. Direction of flow of the ions under the influence of an applied potential is indicated as well as entrance feed streams of aqueous ammonium fluoride and exit streams of aqueous ammonium hydroxide and hydrogen fluoride for recycle. The current in the assembly is transported by migrating catons and anions.

FIG. 3 illustrates a "two-compartment" electrodialytic water-splitting apparatus, where the basic unit, a bipolar membrane cell, with adjacent acid and base compartments is shown located between the anode and cathode compartments, which are usually bounded with cation-permeable membranes. Although only one bipolar membrane cell is shown in FIG. 3, the dashed lines, as in FIG. 2, indicate that a plurality of cells are usually used. The bipolar membrane cell comprises sequentially: anion-permeable membrane; base compartment; bipolar membrane; acid compartment. The basic difference between the two-compartment type of apparatus of FIG. 3 and the three-compartment apparatus of FIG. 2 is that the two-compartment apparatus does not employ separate "salt" compartments. In the two-compartment apparatus, the aqueous ammonium fluoride solution is fed into the base compartment directly. Under the influence of an applied current, fluoride ion, as opposed to hydroxyl ion, will preferentially migrate out of the base compartment through the anion-permeable membrane into the acid compartment. This is due to the fact that the ionization of ammonium hydroxide in the following equation:

$$NH_4OH \rightleftharpoons NH_4^+ + OH^-$$

is relatively small and thus the concentration of free hydroxyl ion available for migration, is relatively small in relation to the large fluoride ion concentration. Thus, fluoride ion will preferentially migrate into the acid compartments resulting in a concentration of fluoride ion in the acid compartment and depletion of fluoride ion concentration in the base compartment. Hydrogen ion formed at the site of the bipolar membrane, as described above, migrates into the acid compartment to form aqueous hydrogen fluoride. The hydrogen ion is constrained from migrating out of the compartment by the anion-permeable membrane. At the same time hydroxyl ion, formed at the site of the bipolar membrane, migrates into the base compartment to form ammonium hydroxide with the ammonium ion residue from the electrolysis of ammonium fluoride. The hydroxyl ion is constrained from migrating out of the compartment because once ammonium hydroxide is formed its dissociation is small.

Both types of apparatus are equally applicable in laboratory and industrial applications and obvious modifications of the two types of apparatus can be made by one skilled in the art without departing from the scope of this invention.

Generally, either the two-compartment or the three-compartment water-splitting apparatus may be used in the process, the exact choice being determined by economic constraints in light of the fact that the three-compartment apparatus requires the use of separate salt compartments. Both types of apparatus can be constructed from conventional materials well known in the art, such as those supplied by the Asahi Glass Company, and the like.

Usually the concentration of aqueous ammonium fluoride, obtained as a by-product in the process prior to electrodialytic water-splitting, is about 5 to 45 weight percent of ammonium fluoride. After electrodialytic water-splitting, the concentrations of aqueous solutions of HF and $NH_4OH$ produced is about 2 to about 45 weight percent. In general, the aqueous solution of HF will generally contain about 0.1 to 10 weight percent $NH_4F$, for use in the digestion step (a), and the ammonium hydroxide solution will generally contain about 0.1 to 10 weight percent of $NH_4F$ for use in the precipitation step (d). The small quantities of $NH_4F$ in both solutions are not deleterious in the subsequent use of either solution in the process.

The temperature at which the electrodialytic water-splitting process is usually carried out is about 15° to 60° C at a pressure of about 1 atmosphere.

The efficiency of the electrodialytic water-splitting process can be measured by molds of acid, HF, produced per Faraday of current passed. Usually about 0.5 to 0.95 moles of HF are produced per Faraday of current passed, corresponding to an acid current efficiency of about 50% to 95%. The term "Faraday", as used herein, is the amount of electric current, viz. 96, 500 coulombs, that can deposit (or dissolve) one gram-equivalent weight of a substance during electrolysis.

A current density of about 5 to 200 amp./ft$^2$ is normally employed for an efficiency of 0.4 to 0.95 mols of HF passed per Faraday of current.

Generally, any conventional type of anode or cathode can be employed in the process and usually it is preferred to use a platinum cathode and platinum anode.

The anolyte can be of any conventional type and one that is usually used is an aqueous solution of 5 weight percent ammonium sulfate. Also the catholyte can be any conventional type used and usually the anolyte and catholyte are the same medium which can be continuously used and recycled during the process.

The following examples are illustrative of our invention and set forth the best mode which we have contemplated of carrying out the invention, but should not be construed to be limitations on the scope or spirit of the invention. Parts, where given are by weight, unless otherwise indicated.

EXAMPLE 1

Three-Compartment Water-Splitting

A three-compartment water-splitting assembly as illustrated in FIG. 2 was used in the example comprising (from the anode side) anode compartment; Nafion ®• perfluorosulfonic acid cation-permeable membrane; salt compartment; cation-permeable membrane; base compartment; bipolar membrane; acid compartment; anion-permeable membrane; salt compartment; Nafion perfluorosulfonic acid cation-permeable membrane; cathode compartment. The anode compartment contained a platinum anode and the cathode compartment a platinum cathode. The bipolar membrane was positioned such that the anion-permeable side faced the anode and the cation-permeable side faced the cathode. The membranes were held in place and separated by polyfluorocarbon cylinders having an inside diameter of 3.7 cm., which formed compartments of 1.5 cm. thickness between the membranes. The cylinders contained internal assemblies for pumping the anolyte, catholyte salt, acid and base solutions to the membranes. A 15 percent by weight ammonium fluoride solution was pumped from a reservoir through the salt compartments and returned to the reservoir. The anolyte and catholyte, and aqueous solution of 5 weight percent ammonium sulfate, was also pumped to the anode and cathode compartments from a common reservoir. The reservoirs supplying the base and acid compartments were calibrated so that volumes of solutions in the systems could be accurately determined. The acid compartment was charged with a 10% by weight hydrogen fluoride solution and the base compartment was charged with a one molar ammonium fluoride solution containing 10% by weight ammonium hydroxide. A direct current of 0.9 amps was passed for a total of 4,000 seconds. The amount of hydrogen fluoride passed into the acid compartment, determined by titration, showed that the current efficiency for hydrogen fluoride production was calculated to be 53%.

EXAMPLE 2

Two-Compartment Water-Splitting

A two-compartment water-splitting assembly as illustrated in FIG. 3, was used in this example, except that the acid compartment nearest the anode was not employed. The formed assembly comprised (from the anode side) anode compartment; Nafion perfluorosulfonic acid cation membrane; base compartment; bipolar membrane; acid compartment; anion-permeable membrane; base compartment; Nafion perfluorosulfonic acid cation membrane; cathode compartment. The bipolar membrane was positioned such that the anion-permeable side faced the anode and the cation permeable side faced the cathode. The acid compartment was fed from a reservoir calibrated such that the volume of the acid solution could be accurately determined. The base compartment was charged with a solution containing 12% by weight of ammonium fluoride and 10% by weight of ammonium hydroxide. The acid compartment was charged with a 10% by weight aqueous hydrogen fluoride solution. The anode and cathode compartments, containing a platinum anode and cathode, respectively, were charged with a 5 weight percent aqueous ammonium sulfate solution. A current of 1.8 amps was passed for a total of 3,000 seconds. From the increase in volume and increase in acid concentration, as determined by titration, the calculated overall acid current efficiency was 61%.

We claim:

1. In a process for producing titanium dioxide from ilmenite-type ore including the steps of
    (a) digesting ilmenite ore with aqueous hydrogen fluoride to form a solution of titanium fluoride compounds and soluble iron fluoride impurities;
    (b) adding aqueous ammonium fluoride and ammonium hydroxide to substantially precipitate iron-ammonium fluoride impurities from the solution;
    (c) separating the remainder of the iron fluoride impurities by precipitating with ammonium sulfide and filtering off;
    (d) adding ammonium hydroxide to precipitate hydrated titanium dioxide and to form aqueous ammonium fluoride;
    (e) calcining the hydrated titanium dioxide to form pigmentary titanium dioxide; and
    (f) converting the precipitated iron-ammonium fluoride impurities from step (b) to form iron oxide and aqueous ammonium fluoride, the improvement which comprises subjecting the combined ammonium fluoride solutions from steps (d) and (f) to electrodialytic water-splitting to form an aqueous solution of ammonium hydroxide and an aqueous solution of hydrogen fluoride and recycling said aqueous ammonium hydroxide to step (d), and said aqueous hydrogen fluoride to step (a).

2. The improvement in accordance with claim 1 wherein the combined solution of ammonium fluoride is subjected to electrodialytic water-splitting by introducing the solution into a salt compartment of a unit cell in an electrodialytic water-splitting assembly sequentially comprising: anode compartment; at least one unit cell; cathode, said anode compartment containing an anode immersed in an anolyte and said cathode compartment containing a cathode immersed in a catholyte, the unit cell sequentially comprising: anion-permeable membrane; salt compartment; cation-permeable membrane; base compartment; bipolar membrane; acid compartment; wherein the acid compartment contains dilute hydrofluoric acid and the base compartment contains dilute ammonium hydroxide, in which assembly under the influence of an applied current, ammonium ion is caused to migrate from the salt compartment through the cation-permeable membrane into the base compartment and is constrained from migrating out of the base compartment by the bipolar membrane, and hydroxyl ion is caused to migrate from the bipolar membrane into the base compartment forming ammonium hydroxide, and fluoride ion is caused to migrate into the acid compartment through the anionpermeable membrane from an adjacent salt compartment and is constrained from migrating out of the acid compartment by the bipolar membrane, and hydrogen ion is caused to migrate from the bipolar membrane into the acid compartment, thus forming hydrofluoric acid, wherein the current in the assembly is transported by migrating cations and anions, and the aqueous ammonium hydroxide in the base compartment is drawn off and recycled to step (d) and the aqueous hydrofluoric acid is drawn off and recycled to step (a).

3. The improvement in accordance with claim 1 wherein the combined solution of ammonium fluoride is subjected to electrodialytic water-splitting by introducing the solution into the base compartment of a bipolar membrane cell in an electrodialytic water-splitting assembly sequentially comprising: anode compartment; at least one bipolar membrane cell; cathode compartment, said anode compartment containing an anode immersed in an anolyte and said cathode compartment containing a cathode immersed in a catholyte, said bipolar membrane cell sequentially comprising anion-permeable membrane; base compartment; bipolar membrane; acid compartment; wherein the acid compartment contains dilute hydrofluoric acid, in which assembly under the influence of an applied electric potential, fluoride ion is caused to migrate out of the base compartment through the anion-permeable membrane into an adjacent acid compartment and is constrained from migrating out of the acid compartment by the bipolar membrane, and hydrogen ion is caused to migrate from the bipolar membrane into the acid compartment thus forming hydrofluoric acid, and hydroxyl ion is caused to migrate from the bipolar membrane into the base compartment, thus forming ammonium hydroxide, wherein the current in the assembly is transported by migrating cations and anions, and said aqueous ammonium hydroxide is drawn off from the base compartment and recycled to step (d) and said hydrofluoric acid is drawn off and recycled to step (a).

4. The improvement in accordance with claim 1 wherein the aqueous ammonium hydroxide solution produced by electrodialytic water-splitting contains ammonium fluoride.

5. The improvement in accordance with claim 1 wherein the aqueous hydrofluoric acid solution produced by electrodialytic water-splitting contains ammonium fluoride.

* * * * *